United States Patent
Perkins

(10) Patent No.: US 9,110,294 B2
(45) Date of Patent: Aug. 18, 2015

(54) IMAGING WITH SHAPED HIGHLIGHT BEAM

(71) Applicant: CHRISTIE DIGITAL SYSTEMS USA, INC., Cypress, CA (US)

(72) Inventor: Michael Perkins, Kitchener (CA)

(73) Assignee: Christie Digital Systems USA, Inc., Cypress ( * ) Notice: Subject to any disclaimer, the term of this patent is extended or adjusted under 35 U.S.C. 154(b) by 225 days.

(21) Appl. No.: 13/839,527

(22) Filed: Mar. 15, 2013

(65) Prior Publication Data

US 2014/0268330 A1    Sep. 18, 2014

(51) Int. Cl.
G02B 27/28 (2006.01)
G02B 27/14 (2006.01)
G02B 27/10 (2006.01)
H04N 9/31 (2006.01)
G03B 21/20 (2006.01)

(52) U.S. Cl.
CPC ............ *G02B 27/14* (2013.01); *G02B 27/1066* (2013.01); *G02B 27/283* (2013.01); *G03B 21/2053* (2013.01); *G03B 21/2066* (2013.01); *H04N 9/3126* (2013.01); *H04N 9/3152* (2013.01)

(58) Field of Classification Search
CPC .. G02B 27/14; G02B 27/283; G02B 27/1066; H04N 9/3126; H04N 9/3152; G03B 21/2053; G03B 21/2066
USPC ..................... 359/485.01, 618, 629
See application file for complete search history.

(56) References Cited

U.S. PATENT DOCUMENTS

| | | | |
|---|---|---|---|
| 6,280,034 B1 | 8/2001 | Brennesholtz | |
| 6,817,717 B2 | 11/2004 | Childers et al. | |
| 7,050,122 B2 | 5/2006 | Gibbon et al. | |
| 7,359,008 B2 | 4/2008 | O'Donnell et al. | |
| 2002/0190922 A1 | 12/2002 | Tsao | |
| 2003/0043348 A1* | 3/2003 | Ito | 353/31 |
| 2006/0187414 A1 | 8/2006 | Bell et al. | |
| 2009/0091734 A1* | 4/2009 | Visser et al. | 355/67 |
| 2012/0038693 A1 | 2/2012 | Kang et al. | |
| 2012/0212707 A1 | 8/2012 | Richards et al. | |

FOREIGN PATENT DOCUMENTS

| | | |
|---|---|---|
| WO | 01/80555 A1 | 10/2001 |
| WO | 01/96907 A2 | 12/2001 |
| WO | 2012/148983 A2 | 11/2012 |

OTHER PUBLICATIONS

Corresponding European Patent Application No. 14159678.3, Extended European Search Report dated Jul. 4, 2014.

* cited by examiner

*Primary Examiner* — Frank Font
(74) *Attorney, Agent, or Firm* — Perry + Currier Inc.

(57) ABSTRACT

A source light beam is split into an illumination beam and a highlight beam. The highlight beam can be controllably shaped into a shaped highlight beam based on a brightness analysis of an image to output. The illumination beam and the shaped highlight beam are combined and provided to an imaging device that generates the image using the combined beam. An array of reflectors, such as a MEMS mirror device, can be used in conjunction with a stacked rod array to generate the shaped highlight beam. The illumination beam and the shaped highlight beam can be combined using offset lenses or a polarizing beam splitter.

19 Claims, 6 Drawing Sheets

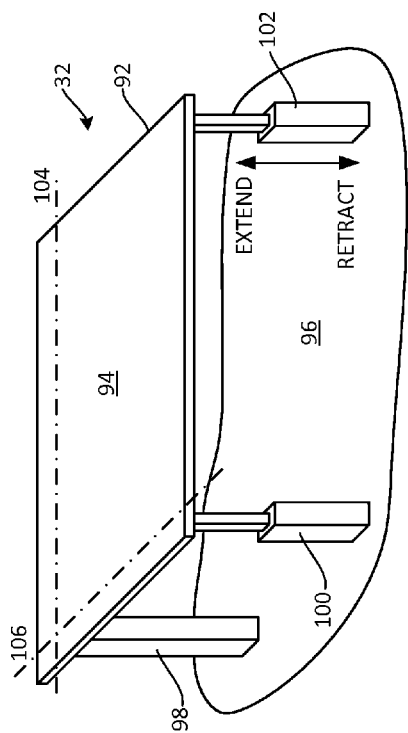
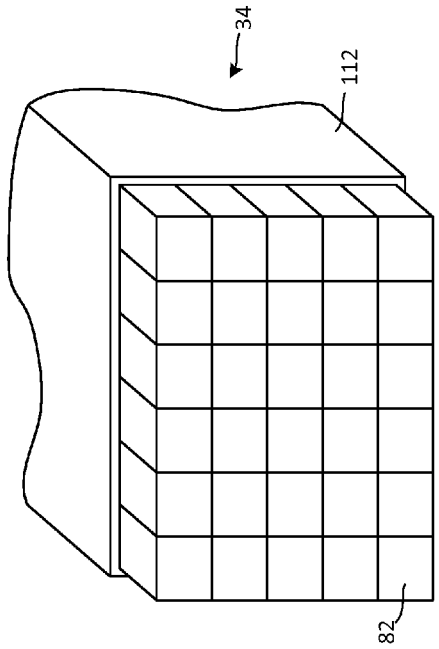
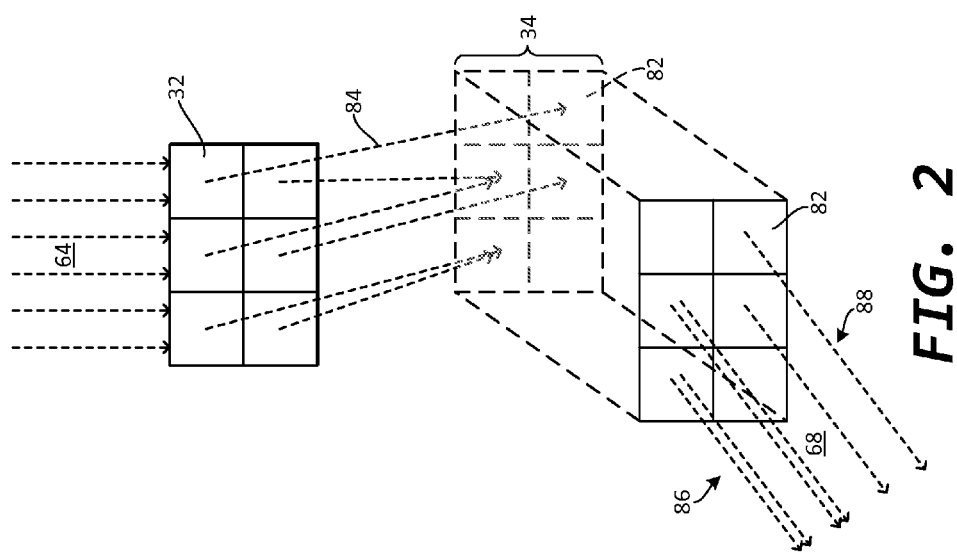

IMAGING WITH SHAPED HIGHLIGHT BEAM

FIELD

This disclosure relates to display imaging, and more particularly, to light shaping or light modulation.

BACKGROUND

In known projector systems, one ongoing source of waste and inefficiency results from generating enough light to support the brightest element of the image to be displayed, focusing the source light onto an imaging device, and then modulating the source light with the imaging device to generate the image, but at the same time, also throw away the majority of the source light. For many typical images, and particularly for video images, the average luminance level can be about 10% of the peak luminance. That can mean about 90% of source light is wasted at the imaging device in the form of heat internal to the projector. Such projectors thus require thermal management systems designed to remove that heat. This also means that the light source must be over-engineered to supply far more light than is actually necessary, which can add cost and complexity to a system.

SUMMARY

According to one aspect of the present disclosure, an imaging apparatus includes a light source configured to emit a source light beam, a beam splitter positioned to split the source light beam into an illumination beam and a highlight beam, a highlight apparatus positioned in a path of the highlight beam and configured to controllably shape the highlight beam into a shaped highlight beam, an optical combiner positioned to combine the illumination beam and the shaped highlight beam, and an imaging device positioned to receive combined light from the optical combiner and configured to generate an image using the combined light according to image data.

The highlight apparatus can include a reflector positioned at a controllable angle.

The highlight apparatus can include a stacked rod array positioned to receive light from the reflector.

The highlight apparatus can include an array of reflectors controllable to selectively direct light to different rods of a stacked rod array.

The imaging apparatus can include micro-electromechanical system that provides the array of reflectors.

The imaging apparatus can include a controller connected to the highlight apparatus and configured to control the array of reflectors to selectively direct light to different rods of the stacked rod array according to a brightness analysis of the image data.

The imaging apparatus can include a controller connected to the highlight apparatus and configured to control the shape of the highlight beam according to the image data.

The controller can be connected to the light source and configured to control light output of the light source according to the image data.

The highlight beam can include between about 10% and about 20% of the light of the source light beam.

The optical combiner can include a pair of offset lenses.

The beam splitter can be a polarizing beam splitter and the optical combiner can include another polarizing beam splitter.

The imaging apparatus can include a half-wave plate configured to controllably polarize the source light beam to control proportions of light in the illumination and highlight beams.

According to another aspect of the present disclosure, a method for imaging includes splitting a source light beam into an illumination beam and a highlight beam, shaping the highlight beam into a shaped highlight beam, combining the illumination beam and the shaped highlight beam, and generating an image using image data and using combined light from the illumination beam and the shaped highlight beam.

Shaping the light beam can include controlling an angle of a reflector.

The method can further include controlling an array of reflectors to selectively direct light of the highlight beam to form the shaped highlight beam.

The method can further include controlling the array of reflectors according to a brightness analysis of the image data.

The method can further include controlling the shape of the shaped highlight beam according to the image data.

The method can further include controlling the source light beam according to the image data.

The method can further include polarizing the source light beam and splitting the source light beam into the illumination beam and the highlight beam based on the polarization of the source light beam.

The highlight beam can include between about 10% and about 20% of the light of the source light beam.

According to another aspect of the present disclosure, an imaging apparatus includes a light source configured to emit a source light beam, a beam splitter positioned to split the source light beam into an illumination beam and a highlight beam, and an array of mirrors positioned in a path of the highlight beam. Each of the mirrors has a controllable tilt angle. The imaging apparatus further includes a stacked rod array having a plurality of rods. The stacked rod array is positioned to receive light from the array of mirrors and output a shaped highlight beam. The imaging apparatus further includes an optical combiner positioned to combine the illumination beam and the shaped highlight beam, an imaging device positioned to receive combined light from the optical combiner and configured generate an image using the combined light according to image data, and a controller connected to the array of mirrors and configured to control the array of mirrors to selectively direct light to different rods of the stacked rod array according to a brightness analysis of the image data.

BRIEF DESCRIPTION OF THE DRAWINGS

The drawings illustrate, by way of example only, embodiments of the present disclosure.

FIG. 2 is a diagram of controllable reflectors providing light to the stacked rod array.

FIG. 3 is a perspective view of one of the reflectors.

FIG. 4 is a perspective view of an end of the stacked rod array.

DETAILED DESCRIPTION

This disclosure describes teachings for what may be known as zonal illumination, beam steering, light shaping, light directing, or light modulation. Further, this disclosure applies to any kind of image, and the terms image and image data may refer to still images, frames of video, and similar.

It should be understood from the below that the teachings described herein can result in improved energy efficiency, improved image contrast, and improved dynamic range in projectors, such as digital cinema projectors, and other systems in which digital images are displayed. By using these teachings, it is possible to generate an image having localized regions of very high brightness coexisting with regions that are very dark, while reducing total light use. Advantageously, a very high dynamic range with very bright highlights can be attained without requiring a large light source.

Figure 1:
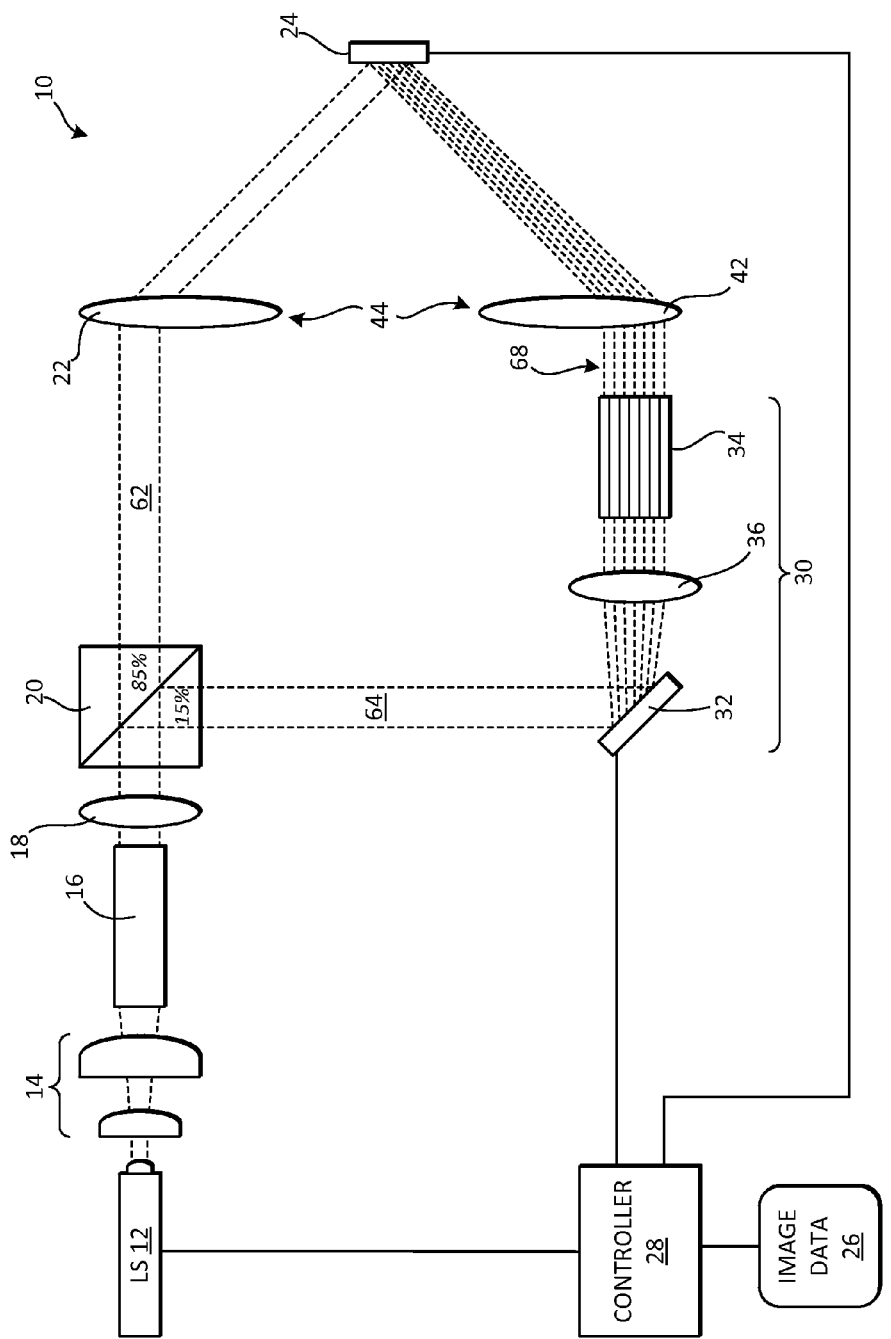
FIG. 1 is a diagram of an imaging apparatus according to an embodiment of the present disclosure.

FIG. 1 shows an imaging apparatus 10 according to an embodiment of the present disclosure. The imaging apparatus 10 uses two light paths to generate an image, one light path providing relatively even illumination and the other path providing shaped highlight illumination for regions of high brightness in the image. The imaging apparatus 10 may be part of an image projector or similar device.

The imaging apparatus 10 includes at least one highly collimated monochromatic light source 12. In some embodiments, the light source 12 includes a fiber-optic ferrule that delivers light from a fiber-optically coupled external laser. In other embodiments, the light source 12 includes a directly coupled laser, a xenon light source, or other kind of light source. The light source 12 may include a plurality of discrete light sources, so as to increase overall light intensity available. Regardless of specific implementation, the light source 12 is configured to emit a source light beam.

The imaging apparatus 10 can further include beam-forming optics 14 configured to expand the source light beam. The beam-forming optics 14 can include any one or more lenses or other optical elements. An integrating rod 16 can be positioned to receive light from the beam-forming optics 14 and output a more homogenous and uniform beam. Relay optics 18, such as one or more lenses or other optical elements, can be provided to deliver the source light beam output by the integrating rod 16 to a beam splitter 20.

In some embodiments, the beam splitter 20 is selected and positioned to allow between about 80% and 90% of the source light beam to be transmitted as an illumination beam 62 and to reflect at 90 degrees the balance of between about 20% and about 10% of the source light beam to form a highlight beam 64. In this embodiment, the beam splitter 20 splits the source beam into an illumination beam 62 having about 85% of the source light and a highlight beam 64 having about 15% of the source light. In other embodiments, other ratios of light concentration for the illumination beam 62 and the highlight beam 64 can be used.

A first offset lens 22 is provided in the path of the illumination beam 62 to direct the illumination beam onto an imaging device 24. In this embodiment, the illumination beam 62 is not shaped or modulated, so that the imaging device 24 is approximately evenly illuminated by the illumination beam 62, which can be considered a DC illumination component usable by the imaging device 24 to generate images.

The imaging device 24 is configured to modulate incoming light according to image data 26, such as video frame image date, and as controlled by a controller 28. The imaging device 24 can include a set of LCD light valves, a digital micromirror device (DMD), a liquid crystal on silicon (LCOS) device, or similar. The imaging device 24 can be positioned to output modulated light to projection optics or other optical element, depending on the application.

The imaging apparatus 10 further includes a highlight apparatus 30 positioned in the path of the highlight beam 64 and configured to controllably shape the highlight beam 64 to form a shaped highlight beam 68. In this embodiment, the highlight apparatus 30 includes at least one reflector 32 positioned at a controllable tilt angle. The reflector 32 is connected to the controller 28 and the tilt angle is controlled by the controller 28. The reflector 32 can normally be aligned at 45 degrees with respect to the incoming highlight beam 64. A plurality of controllable mirrors may be provided as such reflectors 32 in a micro-electromechanical system (MEMS) device, as will be discussed below.

The highlight apparatus 30 may further include a stacked rod array 34 positioned to receive light from the reflector 32. Relay optics 36 may further be provided and may include one or more lenses positioned, for example, between the reflector 32 and the stacked rod array 34. The reflector 32 controls where light enters the stacked rod array 34, which accordingly outputs the shaped highlight beam 68. In some embodiments, relay optics 36 may be provided by a Fourier lens arrangement. When a Fourier lens arrangement is employed for relay optics 36, the distance from relay optics 36 to stacked rod array 34 may be set to match the focal length of the Fourier lens. The location on stacked rod array 34 at which a ray of light from reflector 32 lands is then controlled solely by the angle of reflector 32, which may simplify the calculations to be performed by controller 28.

A second offset lens 42 is provided in the path of the shaped highlight beam 68 to direct the shaped highlight beam 68 onto the imaging device 24. The pair of first and second offset lenses 22, 42 form an optical combiner 44 arranged to combine the illumination beam 62 and the shaped highlight beam 68 at the imaging device, which is positioned to receive the combined light and generate images using the received light according to the image data 26. The offset lenses 22, 42 can be sized and arranged to increase the amount of combined light that remains within the etendue of the imaging device 26. Selecting a light source 12 with a higher f/# can simplify size and arrangement requirements for the offset lenses 22, 42.

The controller 28 is connected to the highlight apparatus 30 and configured to control the shape of the highlight beam 68 according to the image data 26. In operation, the controller 28 references regional brightness values of the image data 26 and accordingly actuates the one or more reflectors 32 to direct light into one or more rods of the stacked rod array 34, so as to shape the relatively uniform highlight beam 64 into the shaped highlight beam 68, which is added to the baseline light provided by the relatively uniform illumination beam 62, to selectively increase brightness available at regions of the imaging device 24. This can advantageously permit localized regions of very high brightness or luminance in the generated image, while maintaining black level performance in areas of the image that do not require much, or any, light.

The controller 28 may further be connected to the light source 12 and control light output at the light source 12 based on the image data 26. This permits the total amount of light available for the highlight beam 64 and the illumination beam 62 to be controlled, so as to reduce or minimize the amount of light wasted. For example, a very dim image may not require much total light, even considering regions of high brightness, and the light source 12 can be controlled accordingly.

Elements of the imaging apparatus 10 may be provided for each of several light sources 12 of different wavelength bands, so as to provide illumination and shaped highlight beams 62, 68 of different colors to one or more imaging devices 24 in order to generate full-color images. In some embodiments, a single imaging device 24 is capable of generating full-color images, and the remaining components of the imaging apparatus 10, aside from the controller 28, are provided in sets for each component color. In other embodiments, several single-color imaging devices 24 are used in combination to generate a full-color image, and thus all components of the imaging apparatus 10, aside from the controller 28, are provided in sets for each component color. In further embodiments, one of every component of imaging apparatus 10 may be provided, alternating which wavelength of light is being emitted at a given time. In still further embodiments, a beam steering mechanism may be included in apparatus 10, and configured to operate on a beam of white light. Thus, multiple imaging devices 24 may be provided (for example, one each for red, green and blue light) in conjunction with single instances of the remaining components of apparatus 10.

FIG. 2 shows an array of reflectors 32 being controlled to selectively direct incoming light of the highlight beam 64 to different rods 82 of the stacked rod array 34. The reflectors 32 may be mirrors or other optical elements capable of redirecting incoming light.

Each reflector 32 receives an incident portion of the highlight beam 64 and reflects a reflected light beam, as indicated by rays 84, according to the controlled tilt of the reflector 32. One or more tilt angles of each reflector 32 are controlled to direct the respective beam 84 to an input face of a selected rod 82 of the stacked rod array 34. The rods 82 guide and output received light as the shaped illumination beam 68.

By manipulating the angles of individual reflectors 32, light distribution across the imaging device 24 can be controlled. For example, each individual reflector 32 can be commanded to target a different rod 82 of the stacked rod array 34, so that highlight illumination is approximately evenly distributed across the imaging device 24. In another example, all reflectors 32 are commanded to target the same rod 82, which places all of the highlight illumination onto one region of the imaging device 24. In another example, as is expected for many images, light is directed by individual reflectors 32 to a smaller number of the rods 82, so that some regions of the imaging device 24 receive highlight illumination, leaving others with only light from the relatively even image-wide illumination beam 62.

As a result, the shaped highlight beam 68 may contain any number of regions of higher light concentration 86 and any number of regions of lower light concentration 88, as controlled by the angles of the reflectors 32.

FIG. 3 illustrates a reflector 32 according to some embodiments. The reflector 32 includes a reflective plate 92, which has a reflective surface 94. The reflective surface 94 can be selected to have a high reflectivity at wavelengths of between about 400 nm and about 700 nm and to be able to withstand irradiance of about 50 Watts per square millimeter. Aluminum is one example of a material that can be used for the reflective surface 94.

The reflective plates 92 can be square in shape, as depicted, or can be of other shapes. Squares may simplify some of the processing required to actuate the reflectors 32. In other embodiments, the reflective plates 92 are shaped as hexagons or equilateral triangles. Other shapes (e.g. ovals) may also be used, although squares, hexagons and equilateral triangles may provide more efficient tiling (that is, providing fewer or no gaps between plates 92). The physical size of the reflective plates 92 can be made large enough to reduce or avoid significant amounts of optical diffraction. A minimum feature size of approximately 50 um is advantageous. More generally, a feature size that is ten times greater than the wavelength of light in use may be advantageous, and a feature size one hundred times greater than the wavelength may be more advantageous. Even larger feature sizes can be used, but should be balanced against the required range of motion. In this embodiment, the reflective plate 92 is thin enough to be flexible.

The reflective plate 92 is connected to a fixed substrate 96. The substrate 96 provides structural support for the reflective plate 92. When a plurality of reflectors 32 are used, the substrate provides a common mechanical reference point for the plurality of reflective plates 92.

A fixed post 98 connects a corner of the reflective plate 92, at a surface opposite the reflective surface 94, to the substrate 96. The fixed post 98 acts as a pivot point about which the reflective plate 92 can bend or tilt.

One or more actuators 100, 102 connect other corners of the reflective plate 92, at the surface opposite the reflective surface 94, to the substrate 96. In this embodiment, two linear MEMS actuators 100, 102 are provided at two corners of the reflective plate 92. The actuators 100, 102 are electrically controlled and are configured to extend and retract, so as to bend or tilt the reflective plate 92 in two dimensions with respect to the fixed post 98. In other embodiments, instead of linear actuators, one or more of another kind of actuator is used, such as a rotational actuator. The actuators typically use piezoelectric elements or electrostatic forces.

Extending or retracting both of the actuators 100, 102 by the same amount causes the reflective plate 94 to bend or tilt about a first axis 104, which is at an end of the plate 94 opposite the end at which the actuators 100, 102 are connected.

Extending or retracting the actuator 102, which is at the corner of the plate 92 diagonally opposite the corner of the fixed post 98, while keeping the other actuator 100 at the same length as the fixed post 98, causes the reflective plate 94 to bend or tilt about a second axis 106, which is approximately perpendicular to the first axis 104.

Extending, retracting, or holding fixed the actuators 100, 102 together or independently of each other can cause the reflective plate 94 to bend or tilt in any manner suitable for reflecting incoming light into any of the rods 82 of the stacked rod array 34. In some embodiments, the reflective plate 92, the stationary post 98, and the actuators 100, 102 are configured to provide +/−3 degrees of tilt. In other embodiments, actuators 100, 102 are configured to provide tilt in only one direction (e.g. +0/−6 degrees of tilt), and the plate 92, post 98 and actuators 100, 102 can be tilted as a whole by, for example, −3 degrees, thus providing a net range of motion of +/−3 degrees of tilt.

The actuators 100, 102 may have rest or un-actuated states, in which the reflective plate 92 resiliently returns to its original flat shape and provides light to a default rod 82 of the stacked rod array 34.

FIG. 4 illustrates a portion of the stacked rod array 34 according to some embodiments. The stacked rod array 34 includes a number of miniature integrating rods 82 tightly packed into an array. A sheath or case 112 can be used to hold the integrating rods 82 together. The rods 82 can have square cross-sections, as depicted, or can have other shaped cross-sections, such as rectangular cross-sections. The aspect ratio of the array 34 can be selected to match the aspect ratio of the imaging device 24 as closely as possible. The stacked rod array 34 acts to illuminate regions of the imaging device 24, in that light transmitted through one of the rods 82 illuminates a corresponding region of the imaging device 24.

The number and arrangement of reflectors 32 can be selected to match the number and arrangement of rods 82, which can advantageously allow the shaped highlight beam 68 to be used for uniform illumination. In such a one-to-one relationship, each reflector 32 can be controlled to direct light to the corresponding rod 82, which may be the default rod 82 for the reflector 32.

Figure 5:
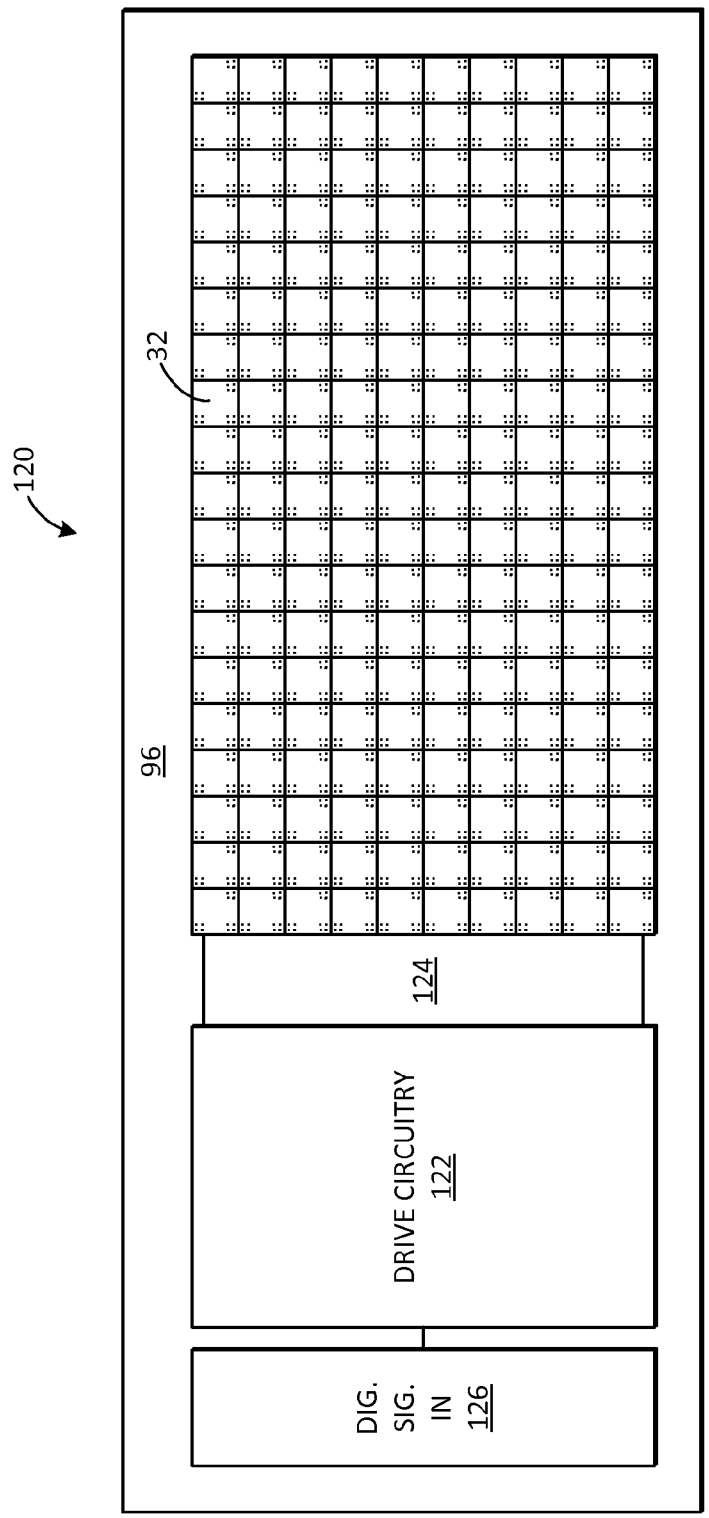
FIG. 5 is a plan view of a MEMS reflector array.

FIG. 5 shows an example of a MEMS device 120 having an array of reflectors 32 according to some embodiments. The MEMS device 120 can be used in the imaging apparatuses described herein at the position indicated for the reflector 32 and at the same angle (e.g., 45 degrees).

An array of reflectors 32 is laid out on the substrate 96. In this example, the array consists of 19 by 10 reflectors and matches the aspect ratio of the imaging device 24. In other examples, the array can have another number and layout of reflectors.

The MEMS device 120 includes drive circuitry 122 connected to the reflectors 32 by a suitable conductive trace layout 124. The drive circuitry 122 can include a number of digital-to-analog converters, at least one for each reflector 32 to control its actuators 100, 102 (FIG. 3). In this embodiment, two digital-to-analog converters are provided for each reflector 32, one to set the extension of each of the actuators 100, 102. Each digital-to-analog converter can be double-buffered, so that actuator drive signals for a next frame of video are loaded while a current frame is being output. A global latching signal can be referenced to activate buffered drive signals and buffer newly received drive signals. Other pipelining techniques can be used as well. In some embodiments, the drive circuitry 122 is configured to set the position of the reflectors 32 within about 100 microseconds.

A digital input 126 is provide on the substrate 96 and is connected to the drive circuitry 122. The digital input 126 includes pins, a connector, or similar to receive input of digital drive signals for the reflectors 32.

In this embodiment, the reflectors 32, drive circuitry 122, conductive trace layout 124, and digital input 126 are integrated on the same MEMS device to simplify manufacture and operation. The MEMS device 120 may be used for any wavelength band of light. In other embodiments, drive circuitry 122 may be provided separately from MEMS device 120.

Although the MEMS device 120 is described in terms of reflectors or mirrors, it should be understood that, in other embodiments, an array of another type of optical element can be used.

Figure 6:
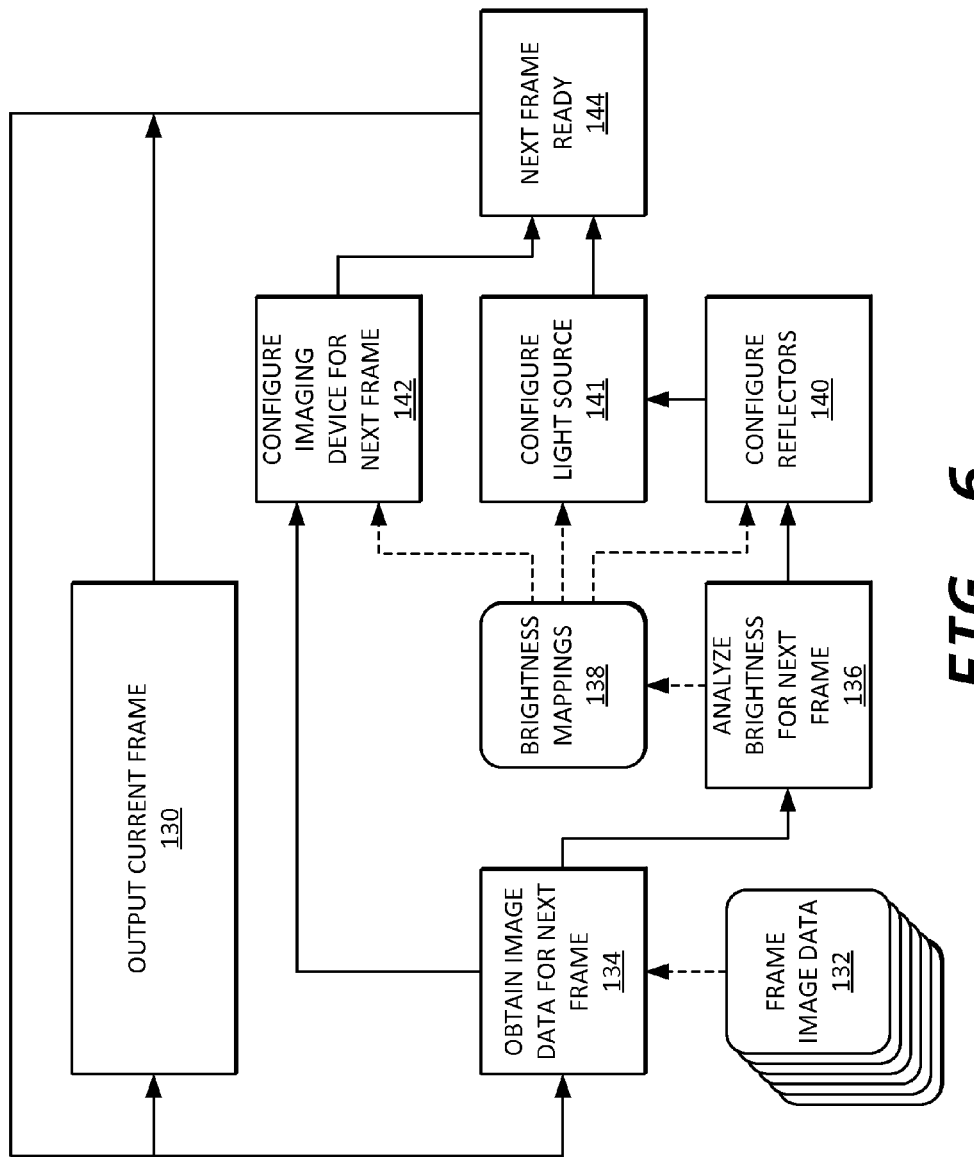
FIG. 6 is a method for video frame output by shaping a highlight beam.

FIG. 6 shows a flowchart of a method of obtaining the illumination beam 62 and the highlight beam 64, shaping the highlight beam 64, and combining the illumination beam 62 and the shaped highlight beam 68 to generate an image. The method can be used with the imaging apparatuses described herein and can be implemented at the controller 28, and will be described in this context. However, the method need not be tied to any particular apparatus. Further, the method is described in the context of video, but the method is not limited in application to video. In addition, brightness as discussed herein can be interpreted as intensity or luminance of a particular wavelength band of light.

At 130, the current frame of video is output by the imaging device 24.

At about the same time, image data for the next frame 132 to be generated is obtained, at 134. This can be performed by the controller 28 loading image data for the next frame into working memory.

After the next frame image data is loaded and as the current frame is output, the next frame image data is analyzed, at 136. The analysis is performed to determine an efficient shape for the shaped highlight beam 68. In this embodiment, the analysis includes analyzing image brightness (intensity or luminance) for a plurality of regions of the image, where the regions map to individual rods 82 (FIG. 4) of the stacked rod array 34. In some embodiments, the analysis 136 can reference brightness mappings 138 that include one or more lookup tables storing relationships between determined brightness in regions of the image and the resulting amount of light required for each rod 82.

At 140, tilt angles for the reflectors 32 for the next frame are selected according to the analysis 136 and the brightness mappings 138. Then, after output of the current frame ends, the selected tilt angles for the reflectors 32 are put into effect, so as to distribute light onto the imaging device 24 according to the shaped highlight beam 68 determined by the analysis 136. This can be accomplished by, for example, the global latching signal causing the drive circuitry 122 (FIG. 5) to activate buffered drive signals. Accordingly, for greater computational efficiency, the brightness mappings 138 may store regional brightness requirements in association with digital drive signals directly usable by the drive circuitry 122.

At about the same time as the reflectors 32 are being tilted, at 140, the light source 12 can be configured, at 141. For instance, a laser power level can be adjusted according to the brightness mappings 138 to ensure that a suitable total amount of light is emitted for the illumination beam 62 and the shaped highlight beam 68. To facilitate this, the brightness mappings 138 may further store light source output levels in association with a total brightness requirement for the frame. Light source output levels may be stored as power levels or power control parameters for direct control of the light source 12.

For illustrative purposes the shape of the highlight beam 68 is described as set at step 140, while the intensities of both the illumination beam 62 and the highlight beam 64, which is transformed into the shaped highlight beam 68, are described as set at step 141. However, the actions represented by steps 140 and 141 can be performed sequentially in any order (as depicted), in parallel, or iteratively.

At about the same time as the reflectors 32 are being tilted for the next frame (at 140) and the light source 12 is being adjusted (at 141), the imaging device 24 is configured for the next frame, at 142. The imaging device 24 can be configured based on the image data 134 and further based on the shape of the highlight beam 68 (e.g., mappings 138), so that the product of the pixels values of the imaging device 24 and the local amount of light available, as provided by the combining of the illumination beam 62 and the shaped highlight beam 68, equals the desired image.

Configuring the reflectors, light source, and imaging device for the next frame, at 140, 141, 142, is controlled to occur after output of the current frame has ended. Once the reflectors are at the selected angles, the light source level is adjusted, and the imaging device is configured for the next frame, then, at 144, the next frame becomes the current frame and the method is repeated.

As mentioned with respect to FIG. 5, double-buffering or other pipelining techniques can be used to reduce the transition time between frames. That is, digital drive signals for the reflectors can be pre-calculated for one or more frames ahead of the current frame. Then, in response to the frame transitioning global latching signal, the pre-calculated digital drive signals for the reflectors can be activated. Similarly, output levels for the light source can be pre-calculated and then effected based on the same global latching signal.

Reflector tilt can be adjusted for each frame of a video during real-time playback. The time required for tilting the reflectors 32, at 140, is not expected to be substantially longer than the time needed to configure the imaging device 24 for the next frame, when pipelining or double-buffering is employed. However, analysing image brightness and adjusting the reflectors 32 need not be performed for each frame. Brightness analysis can be performed for a set of frames, and reflectors 32 can be tilted on that basis. In other embodiments, a block of frames can be processed together. For example, average regional brightness for the next 24 frames can be determined and the reflectors 32 can be tilted at the time the first frame of the set is output. The reflectors 32 can remain at these angles for the next 23 frames, while a brightness analysis is carried out for the next set of 24 frames. This can reduce processing load as well as extend the life of MEMS actuators 100, 102 of the reflectors 32. In a similar manner, light source output levels can also be processed for a block of frames.

In other embodiments, one result of the brightness analysis is a number of frames for which to maintain the established angles of the reflectors 32, while another result is the next configuration of reflector angles to select after such number of frames. In a similar manner, a number of frames to maintain light source output at a current level and a particular frame at which to adjust the light source level can be determined.

In still other embodiments, an entire video or portion thereof is preprocessed to obtain a set of reflector drive signals and light source output levels, which are included as metadata with the source video. In such embodiments, real-time or near real-time processing is not performed and the output of the analysis at 140, 141 (FIG. 6) can be saved rather than being used for immediate control. This can advantageously permit the creator or editor of a digital film to benefit from the advantages discussed herein during editing.

It is contemplated that, for a given shape of the highlight beam 68 outputted at the stacked rod array 34, there may be many different yet equally suitable sets of angles for the reflectors 32. That is, because many reflectors 32 are capable of targeting a particular one of the rods 82 of the stacked rod array 34, there is redundancy in specifically which reflector 32 is used to target a particular rod 82. This may be taken into account in the brightness mappings 138, which can be configured to reduce or minimize the change in tilt angle required from the reflectors (e.g., a reflector transitioning from +3 degrees to −3 degrees in one frame is avoided when possible), which can reduce the time require to configure the reflectors 32.

Figure 7:
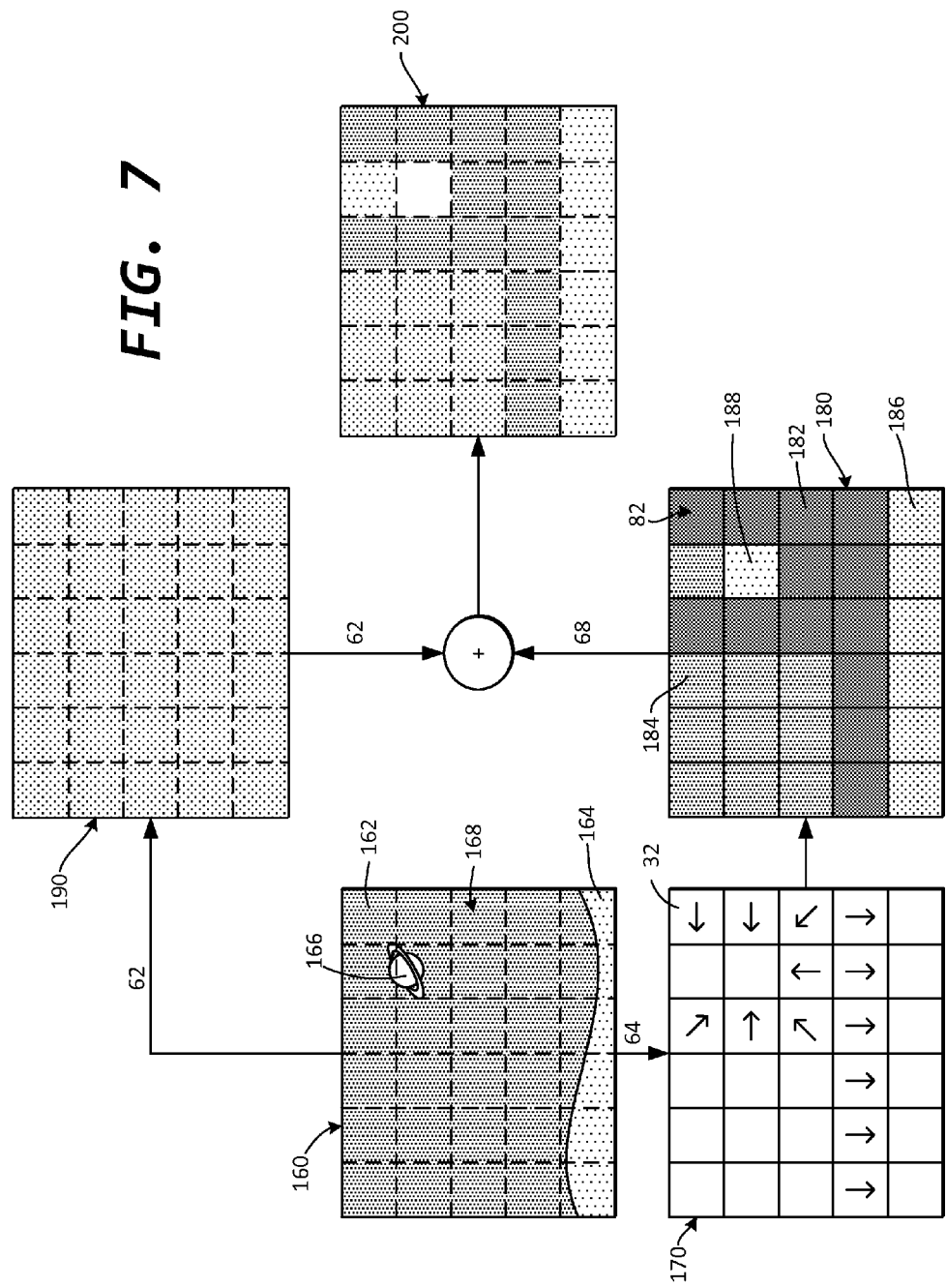
FIG. 7 is a schematic diagram of an example of imaging using the shaped highlight beam.

FIG. 7 shows a schematic diagram of an example of imaging according to teachings described herein.

An example image 160, such as a frame of video, to output at the imaging device 24 includes a dark area 162, a brighter area 164, and a smaller but very bright area 166. For illustrative purposes, the image 160 is shown divided by dashed lines into regions 168 that correspond to rods 82 of the stacked rod array 34 of the highlight apparatus 30.

An analysis is performed on the image 160, to arrive at brightness requirements for each of the regions 168. Light is split into two beams, as discussed, specifically the relatively uniform illumination and highlight beams 62, 64.

An array 170 of reflectors 32 is configured by tilting some of the reflectors 32 to direct light to specific regions 168 identified by the analysis requiring more light. Reflector tilt is illustratively shown by the arrows, in that the direction of an arrow on a reflector 32 indicates the direction that light is directed to with respect to the stacked rod array 34. Reflectors 32 shown without arrows are not tilted and direct light to their default rods 82.

Light as reflected by the array 170 of reflectors 32 arrives at the stacked rod array 34 and is output at an outlet end, shown schematically at 180, of the stacked rod array 34. Due to the set tilts of the reflectors 32, the light output of each rod 82 is such that no or little light is emitted by rods, indicated at 182, whose normally aligned or default reflectors 32 are directed to other rods. Other rods, indicated at 184, 186, receive light from more than one reflector, and one rod in particular, indicated at 188, receives much more light than the others due to a large number of reflectors being tilted towards it.

The shaped highlight beam 68 outputted by the stacked rod array 34 and the illumination beam 62, having a relatively uniform intensity profile as indicated at 190, are then combined to form combined light 200 incident at the imaging device 24. The combined light 200 has regions of varying brightness that correspond to the regions 182-188 in the highlight beam 68 but that are of increased intensity due to additive effect of the even illumination beam 62. Comparing the combined light 200 incident on the imaging device 24 with brightness profile of the image 160, it can be seen that the combined light 200 is an efficient use of light and provides for a high degree of contrast. Waste of light by the modulation of the imaging device 24 to arrive at the image 160 is reduced because the combined light 200 inputted to the imaging device 24 is regionally distributed in an appropriate manner.

Figure 8:
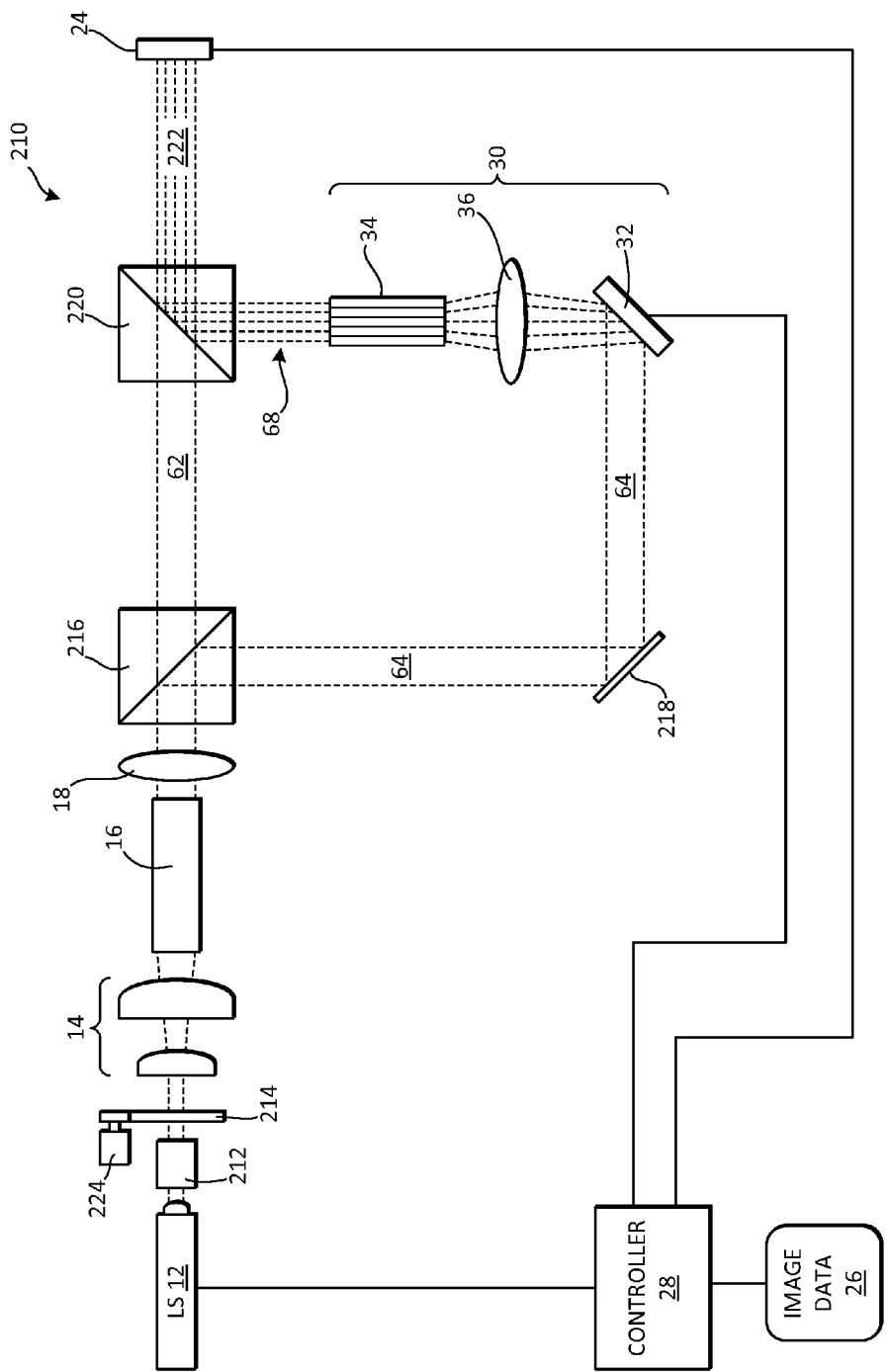
FIG. 8 is a diagram of an imaging apparatus according to another embodiment.

FIG. 8 shows an imaging apparatus 210 according to another embodiment. The imaging apparatus 210 is similar to the imaging apparatus 10 and only differences will be described in detail. The description for the imaging apparatus 10 can be referenced for components having like reference numerals.

The imaging apparatus 210 includes polarization recovery optics (PRO) 212 at the light source 12. Output of the PRO 212 is directed to a half-wave plate 214, having an orientation angle that shifts the polarization of the source light by a corresponding amount.

The imaging apparatus 210 further includes a polarizing beam splitter (PBS) 216 located in the path of the source light beam output by the light source 12. The PBS 216 splits the source light beam into an illumination beam 62 and a highlight beam 64, which are directed, in this embodiment, at 90 degrees from each other. The proportions of light in each of the illumination beam 62 and the highlight beam 64 are a function of the orientation angle of the half-wave plate 214.

The imaging apparatus 210 further includes a mirror 218 or other reflector positioned and angled (e.g., at 45 degrees) to reflect the highlight beam 64 into the highlight apparatus 30, which is positioned differently relative to the embodiment of FIG. 1. A shaped highlight beam 68 is output from the highlight apparatus 30, as discussed elsewhere herein.

The imaging apparatus 210 further includes a second PBS 220 positioned to combine the illumination beam 62 and the shaped highlight beam 68 to form a combined light beam 222. The second PBS 220 thus acts as an optical combiner, similar to the offset lenses 22, 42 of FIG. 1, but by using the principles of light polarization.

In some embodiments, the imaging apparatus 210 further includes an actuator 224, such as a stepper motor and gearing, configured to control the orientation angle of the half-wave plate 214. This can controllably provide different proportions of light to the illumination beam 62 and the shaped highlight beam 68. The actuator 224 can be connected to the controller 28 to control the orientation of the half-wave plate 214 based on the brightness analysis discussed above. The brightness mappings 138 can include orientation angles for the half-wave plate 214. Thus, different frames of a video can be provided with different proportions of light in the illumination beam 62 and the shaped highlight beam 68 to further increase light use efficiency.

Because a shaped highlight beam can be controlled to direct light to one or more regions of an imaging device, in addition to the overall even illumination provided, light can be directed without the kinds of losses typical of systems that modulate light by filtering. Very bright regions and very dark regions can be provided in the same image, while at the same time light use efficiency can be improved. A very high dynamic range with very bright highlights is possible without requiring a large light source.

While the foregoing provides certain non-limiting example embodiments, it should be understood that combinations, subsets, and variations of the foregoing are contemplated. The monopoly sought is defined by the claims.

What is claimed is:

1. An imaging apparatus comprising:
    a light source configured to emit a source light beam;
    a beam splitter positioned to split the source light beam into an illumination beam and a highlight beam;
    a highlight apparatus connected to a controller, the highlight apparatus positioned in a path of the highlight beam and configured to controllably shape the highlight beam into a shaped highlight beam, the controller configured to shape the highlight beam according to image data;
    an optical combiner positioned to combine the illumination beam and the shaped highlight beam into combined light; and
    an imaging device positioned to receive combined light from the optical combiner and configured to use the image data to generate an image from the combined light.

2. The apparatus of claim 1, wherein the highlight apparatus comprises a reflector positioned at a controllable angle.

3. The apparatus of claim 2, wherein the highlight apparatus further comprises a stacked rod array positioned to receive light from the reflector.

4. The apparatus of claim 1, wherein the highlight apparatus comprises an array of reflectors controllable to selectively direct light to different rods of a stacked rod array.

5. The apparatus of claim 4, further comprising a microelectromechanical system having the array of reflectors.

6. The apparatus of claim 4, wherein the controller is configured to control the array of reflectors to selectively direct light to different rods of the stacked rod array according to a brightness analysis of the image data.

7. The apparatus of claim 1, wherein the controller is further connected to the light source and configured to control light output of the light source according to the image data.

8. The apparatus of claim 1, wherein the highlight beam comprises between about 10% and about 20% of the light of the source light beam.

9. The apparatus of claim 1, wherein the optical combiner comprises a pair of offset lenses.

10. The apparatus of claim 1, wherein the beam splitter is a polarizing beam splitter and the optical combiner comprises another polarizing beam splitter.

11. The apparatus of claim 10, further comprising a half-wave plate configured to controllably polarize the source light beam to control proportions of light in the illumination and highlight beams.

12. A method for imaging, the method comprising:
    splitting a source light beam into an illumination beam and a highlight beam;
    shaping the highlight beam into a shaped highlight beam;
    using a controller to control the shape of the shaped highlight beam according to image data;
    combining the illumination beam and the shaped highlight beam into combined light; and
    generating an image using the image data and using the combined light from the illumination beam and the shaped highlight beam.

13. The method of claim 12, wherein shaping the light beam comprises controlling an angle of a reflector.

14. The method of claim 12, further comprising controlling an array of reflectors to selectively direct light of the highlight beam to form the shaped highlight beam.

15. The method of claim 14, further comprising controlling the array of reflectors according to a brightness analysis of the image data.

16. The method of claim 12, further comprising controlling the source light beam according to the image data.

17. The method of claim 12, further comprising polarizing the source light beam and splitting the source light beam into the illumination beam and the highlight beam based on the polarization of the source light beam.

18. The method of claim 12, wherein the highlight beam comprises between about 10% and about 20% of the light of the source light beam.

19. An imaging apparatus comprising:
    a light source configured to emit a source light beam;
    a beam splitter positioned to split the source light beam into an illumination beam and a highlight beam;
    an array of mirrors positioned in a path of the highlight beam, each of the mirrors having a controllable tilt angle;
    a stacked rod array having a plurality of rods, the stacked rod array positioned to receive light from the array of mirrors and output a shaped highlight beam;
    an optical combiner positioned to combine the illumination beam and the shaped highlight beam;
    an imaging device positioned to receive combined light from the optical combiner and configured generate an image using the combined light according to image data; and
    a controller connected to the array of mirrors and configured to control the array of mirrors to selectively direct light to different rods of the stacked rod array according to a brightness analysis of the image data.

* * * * *